United States Patent
Chung et al.

(10) Patent No.: US 6,421,384 B1
(45) Date of Patent: Jul. 16, 2002

(54) SYSTEM AND METHOD FOR CONTOUR-BASED MOTION ESTIMATION

(75) Inventors: Jae-Won Chung, Seoul; Cheol-Soo Park, Kyonggi-do; Joo-Hee Moon; Jae-Kyoon Kim, both of Seoul, all of (KR)

(73) Assignee: Hyundai Curitel, Inc. (KR)

( * ) Notice: Subject to any disclaimer, the term of this patent is extended or adjusted under 35 U.S.C. 154(b) by 0 days.

(21) Appl. No.: 09/180,906

(22) PCT Filed: May 16, 1997

(86) PCT No.: PCT/KR97/00085

§ 371 (c)(1),
(2), (4) Date: Nov. 17, 1998

(87) PCT Pub. No.: WO98/42133

PCT Pub. Date: Sep. 24, 1998

(30) Foreign Application Priority Data

Mar. 20, 1997 (KR) ................................. 97-9570

(51) Int. Cl.$^7$ ................................................ H04N 7/18
(52) U.S. Cl. .............................. 375/240.09; 375/240.08
(58) Field of Search .................... 375/240.09–240.17

(56) References Cited

U.S. PATENT DOCUMENTS 5,883,977 A * 3/1999 Kim ............................ 382/242
5,978,510 A * 11/1999 Chung et al. ................ 382/238
6,075,875 A * 6/2000 Gu .............................. 382/107

* cited by examiner

*Primary Examiner*—Andy Rao
(74) *Attorney, Agent, or Firm*—Blakely Sokoloff Taylor & Zafman

(57) ABSTRACT

A method and system for contour-based motion estimation for use with video images. The invention establishes corresponding contours (404, 414) in two images (402, 412) in a sequence of images, determines a motion vector which includes how the first contour (404) moved to become the second contour (414), and transmits the motion vector of the contour (414) in order to permit accurate display of the second video image (412). Preferably, boundary lines are removed from the contours before a comparison is made. The invention is computationally efficient and economical from a data transmission point of view, while enabling the production of accurate image.

29 Claims, 7 Drawing Sheets

SYSTEM AND METHOD FOR CONTOUR-BASED MOTION ESTIMATION

TECHNICAL FIELD

This invention relates to a digital video compression technology and, more particularly, to novel systems and methods for determining contour-based motion estimation for compressing and transmitting video images so that they may be accurately reconstructed for providing quality images.

BACKGROUND ART

Since digital computers were introduced in the 1930's, they have been used in many areas of industry, including communications and in the video industry. One of the significant recent developments using digital computers involves data storage on an appropriate storage media and data communication (involving video data) transmitted through local area networks, and other communication network such as wide area network, Internet, World Wide Web, and others.

Video images as they can be seen on television or a computer screen are actually a series of still pictures. Each of the still pictures is called a frame. By showing the frames at a rapid rate, such as approximately 30 frames per second, human eyes can recognize the pictures as a moving scene. This invention concerns efficiently encoding and transmitting and accurately reconstructing and displaying video images.

For the purposes of this document, it will be useful to introduce terms with which the reader will need to be familiar in order to fully comprehend the disclosure contained herein. These terms are as follow:

B-frame: bidirectional predicted frame. A frame that is encoded with a reference to a past frame, a future frame or both.

Bitrate: the rate at which a device delivers a compressed bitstream to an input of another device.

I-frame: intra coded frame—a frame coded using information only from its own frame and not reference to any other frame.

I-VOP: intra coded video object plane—a video object plane coded using information only from the video object plane and not from any other video object plane.

IEC: International Electrotechnical Commission.

ISO: International Organization for Standardization.

Motion estimation: a process of estimating motion vectors for a video image.

MPEG: Moving Picture Experts Group. A group of representatives from major companies throughout the world working to standardize technologies involved in transmission of audio, video, and system data. Video coding standards are developed by the MPEG video group.

MPEG-1: a standard for storage and retrieval of moving pictures and associated audio on storage media. The current official denotation is ISO/IEC/JTC1/SC29/WG11.

MPEG-2: a standard for digital television at data rates below 10 Mbit/sec. The study began in 1990 and the standard for video was issued in early 1994.

MPEG-3: a standard initially to suit coding of high Definition TV (HDTV). MPEG-3 was later merged into MPEG-2.

MPEG-4: a standard for multimedia applications. This phase of standardization started in 1994 to accommodate the telecommunications, computer and TV/film industries.

MPEG-7: a content representation standard for various types of multimedia information.

P-frame: forward predictive frame. A frame that has been compressed by encoding the difference between the current frame and the past reference frame.

P-VOP: forward predictive video object plane. A video object plane that has been compressed by encoding the difference the video object plane and the past reference video object plane.

Pel: picture element in a digital sense. A pel is the digital version of a pixel in analog technology.

Video image: an image containing a video object, multiple video objects, a video object plane, an entire frame, or any other video data of interest.

VOP: video object plane as defined in MPEG-4. An image or video content of interest.

With the general meaning of this terminology in mind, a description of the general problems of the prior art and a detailed description of the operation of the invention are provided below.

Generally, when a video signal is digitized, a large amount of data is usually generated. For example, if a frame of a video image in a sequence of such frames is digitized as discrete grids or arrays with 360 pels (or pixels) per raster line and 288 lines/frame, approximately 311 Kbytes of memory capacity is necessary to store that one frame, assuming each pixel uses 8 bits of space to store color data. On a screen, a moving picture needs at least 30 frames per second to provide a realistic image. The raw data rate for a picture is about 72 Mbits per second or 4,320 Mbit (540 Mbyte) per minute. Therefore, it is almost impractical to store digital video data on a media or to send digital video data of several minutes to another location.

Moreover, real time transmission of video signals is impossible since no hardware currently available can provide the speed required to process the massive amount of data. Therefore, it is essential to compress the digital video data in order to generate moving pictures that are manageable using a current hardware technology.

A number of attempts have been made in the prior art to accomplish video data compression. Researchers discovered that the compression ratio of conventional lossless methods, such as Huffman, Arithmetic, and LZW, are not high enough for image and video compression. Fortunately, consecutive video pictures are usually quite similar from one to the next. Taking advantage of this, typically the prior art utilizes common video characteristics, such as spatial redundancy, temporal redundancy, uniform motion, spatial masking, and others to compress video picture data as used in Joint Photographic Expert Group (JPEG), H.261 compression, Moving Picture Experts Group (MPEG), and others.

One attempt to solve the problems of the prior art was made by a group called the Moving Picture Experts Group (MPEG) under the auspices of the International Organization for Standardization (ISO) and the International Electrotechnical Commission (IEC). Formed in 1988, this group has accomplished standardization of compression techniques for video, audio, and system which can be used throughout the world. Some of the standardization efforts of this group have been resulted in the standards known as MPEG-1 and MPEG-2 (into which MPEG-3 was merged). At the present time, the Group is working on an MPEG-4 standard.

A typical technique in compression, as adopted in the MEPG standard series, uses compression based on the Discrete Cosine Transform (DCT) and a motion compensation technique. The DCT-based compression is used to reduce spatial redundancy, and motion compensation is used to exploit temporal redundancy. Even though the Group working on MPEG-4 has adopted Shape Adoptive Discrete Cosine Transform (SADCT), the basic concept behind both DCT and SADCT is the same.

In MPEG-1 and MPEG-2, a frame can be usually encoded into three different types: intra-frame (I-frame), forward predictive frame (P-frame), and bi-directional predicted frame (B-frame). An I-frame is a frame that has been encoded independently as a single image without reference to other frames. A P-frame is a frame that has been compressed by encoding the difference between a frame and a past reference frame which is typically an I-frame or P-frame. A B-frame is a frame that has been encoded relative to a past reference frame, a future reference frame, or both. A typical group of encoded frames has a series of these types of frames in combination.

Each frame is typically divided into macroblocks. A macroblock consists of 16×16 sample array of luminance (grayscale) samples together with one 8×8 block sample for each of two chrominance (color) components. Macroblocks are the units of motion-compensated compression, and blocks are used for DCT compression.

When DCT compression is used, blocks are first transformed from the spatial domain into a frequency domain using the technique provided by DCT compression. Generally, DCT is a method of decomposing a block of data into a weighted sum of spatial frequencies. For example, an analog signal is sampled by discrete cosine functions with different spatial frequencies. Each of these spatial frequency patterns has a corresponding coefficient which is the amplitude representing the contribution of that spatial frequency pattern in the block of data being analyzed. In an 8×8 DCT, each spatial frequency pattern is multiplied by its coefficient and the resulting 64 amplitude arrays (8×8) are summed, each pel separately, to reconstruct the 8×8 block. In the DCT compression technique, quantization needs to be performed after the frequency conversion to significantly reduce the number of data by removing non-zero data values for the coefficients.

When macroblocks are reconstructed from I-frame information, P-frame and/or B-frame information, macroblocks usually overlap each other. Reconstructed macroblocks, such as by frame prediction, do not form a clean frame because predicted macroblocks are usually shifted from their original positions. Therefore, a motion estimation for each macroblock is necessary to compensate for the shift. The prior art method of motion estimation is performed by comparing each pel of a macroblock array against a corresponding array of the next frame within a certain range. Motion-compensated coding is an example of inter-frame encoding. When a best matching array is found, a motion vector is calculated by comparing the current position with the previous position of the macroblock. The process of finding a motion vector for each macroblock has to be repeated for all macroblocks in the frame. As can be seen from this discussion, the necessary computations are complex, use significant computing resources, and result is an inaccurate image that must be corrected before it is displayed.

In a relatively new development in the prior art, MPEG-4 supports content-based video functionality which requires introduction of the concept of video object planes (VOPs). A frame can be segmented into a number of arbitrarily shaped image regions which are video object planes. A VOP can be an image or a video content of interest. Unlike the video source format used in MPEG-1 and MPEG-2, video input is not necessarily a rectangular region. Since the MPEG-4 standard uses the VOP concept, terminology used for encoding types of MPEG-4 are I-VOP, P-VOP, and B-VOP, instead I-frame, P-frame, and B-frame as used for MPEG-1 and MPEG-2.

MPEG-4 uses both binary shape encoding and greyscale shape encoding. A video object of interest can be differentiated from the background. In binary shape encoding, a video object can be defined as either opaque or transparent to the background. In the grey scale encoding, however, the relatedness of the video object to the background can also be defined within a scale from zero to 255 between opaque (255) and transparent (0). MPEG-4 uses modified MMR coding for binary shape information, and motion compensated DCT coding for grey scale shape information.

The prior art has some disadvantages which are generally recognized in the industry. First, when a frame is reconstructed by assembling macroblocks from the previous frame, realization of the original frame is usually impossible unless an accurate motion estimation is performed for each macroblock. This may result in a serious problem. For example, a shape divided into several macroblocks cannot be restored to its original picture with one continuous edge. An image segmented into several macroblocks does not align smoothly when it is reassembled. As a consequence, a continuous edge in the original shape becomes broken at the borders of each macroblock. The resulting poor image quality is a serious concern and can be improved by implementing a concept as disclosed in the present invention.

Moreover, the processing time involved in performing DCT compression, quantization, and motion estimation is very substantial. For example, an 8×8 block requires typically at least 1024 multiplications and 896 additions to perform DCT compression. Particulary, the time required to process motion estimation is great because motion estimation has to be performed for entire macroblocks as defined in a frame. Obviously, implementing a system of this complexity requires significant coding, introducing a substantial possibility of programming error.

DISCLOSURE OF THE INVENTION

In view of the foregoing, it is a primary object of the present invention to provide a method and a system for contour-based motion estimation, which is capable of reconstructing a better quality video image without discontinued contour. It is a feature of the invention that contour recognition is utilized which results in an accurate image, unlike the prior art.

It is also an object of the present invention to provide a method and a system for determining a contour-based motion estimation, which is capable of efficiently reducing processing time for motion estimation of a video image. The invention includes an important feature of computational and processing simplicity, resulting in only moderate use of computing resources.

Further, it is an object of the present invention to provide a system for contour-based motion estimation which is capable of transmitting a relatively low number of motion vectors for a video image compared to the prior art. The invention, being capable of selecting data for transmission based on contour location changes, omits the redundant data transmission of the prior art and only transmits data required for an accurate image reconstruction.

It is still further an object of the present invention to provide a method and a system of determining motion estimation which is capable of generating overhead information to be transmitted that reduces the total amount of data transmitted. The overall information to be transmitted can be substantially less than in the prior art because relevant information can be transmitted as overhead information, not as actual picture data. Therefore, the present invention can reduce the redundancy of transmitted data.

Consistent with the foregoing objects, and in accordance with the invention as embodied and broadly described herein, a method and a system for contour-based motion estimation is disclosed in one embodiment of the present invention.

The foregoing and other objects and features of the present invention will become more fully apparent from the following description and appended claims, taken in conjunction with the accompanying drawings.

BRIEF DESCRIPTION OF THE DRAWINGS

Understanding that these drawings depict only typical embodiments of the invention and are, therefore, not to be considered limiting of its scope, the invention will be described with additional specificity and detail through use of the accompanying drawings in which.

MODES FOR CARRYING OUT THE INVENTION

It will be readily understood that the components and steps of the present invention, as generally described and illustrated in the Figures herein and accompanying text, could be arranged and designed in a wide variety of different configurations while still utilizing the inventive concept. Thus, the following more detailed description of the preferred embodiments of the system and method of the present invention, as represented in FIGS. 2 through 7 and accompanying text, is not intended to limit the scope of the invention, as claimed, but it is merely representative of the presently preferred embodiments of the invention. The presently preferred embodiments of the invention will be best understood by reference to the drawings, wherein like parts or steps are designated by like numerals throughout.

As an introductory matter before discussing the figures, the reader should understand that there are generally two types of video images that may be encountered by the invented system. The first type of video image is reference to as an "intra" video image because there is no successive video image against which a meaningful comparison can be made (which would make it a "non-intra" video image.) For example, when a film starts, the first frame shown is an intra video image because there was no preceding reference frame. Or when a film cuts to a new scene, the first frame of the new scene is an intra video image because the preceding frame was an entirely different image. In this situation, the VOP unit process is followed without using the invented methods.

The second type of video image is referred to as a "non-intra" video image (e.g. P-frame, B-frame, P-VOP, and B-VOP). In this type, the present invention again examines the differences between the previous video image and the current video image to see whether the invented method described below can be efficiently used. If the process determines that the difference between two video images is too great, then the invented method will be omitted in processing the video data and a prior art method will be used instead. If the video image has contour differences from a previous video image of a magnitude that the invented method will be efficient, contour based motion estimation of the invention is performed and relevant information is prepared for transmission.

Figure 1:
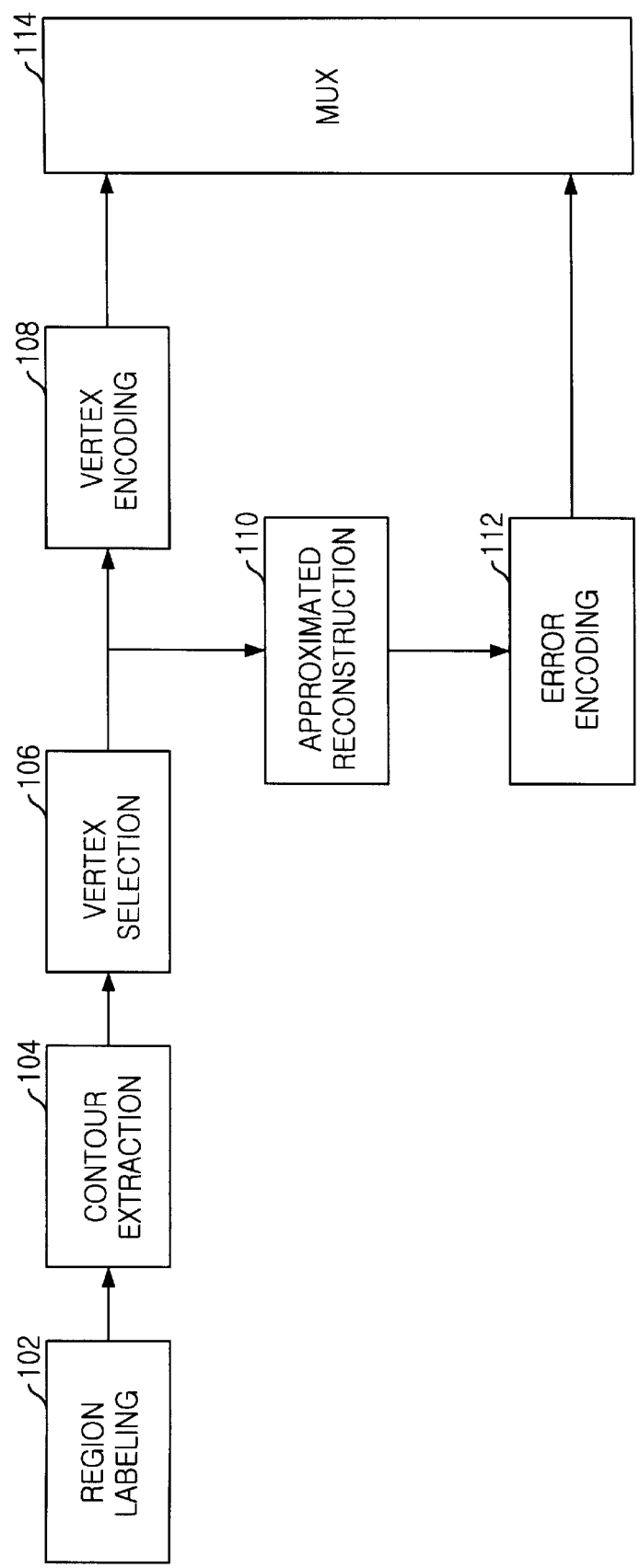
FIG. 1 is a diagram of a method for video data compression in intra video object plane mode as applied before the invention.

Referring now to FIG. 1, a method for processing a frame or VOP as a stand-alone unit or "intra" is shown. As a reminder, intra processing is performed when a frame or VOP has no preceding video image to which it can be readily compared.

The first step is region labeling 102 which includes identifying and labeling various regions within a frame or VOP. Next, contour extraction 104 is performed by initially performing a raster scan from a binary shape information to find a pixel on the contour. This scan is preferably performed pel to pel to identify a pel on the contour. When a pel on the contour is found, contour tracing is performed as described in FIG. 3 and the text below in which more details on contour tracing are provided.

Next, vertex selection 106 is performed. Vertex selection includes a process to find best fit vertices for the contour using the contour coordinates from contour extraction 104. Vertex selection also includes vertex refinement, adjustment and reordering in order to reduce the number of vertices to process or transmit.

The next step, vertex encoding 108, is performed in order to eventually transmit vertex information to another device or location. The result from vertex encoding 108 is transmitted to multiplexer 114. Vertex selection 106 results are also processed for approximated reconstruction 110 and error encoding 112 with the results therefrom being also transmitted to multiplexer 114. The multiplexed data is then transmitted to an appropriate device for reconstruction and subsequent display. Even though the vertex-based binary shape encoding method is an improvement over the prior art, the video data still includes redundant data which can be eliminated by the present invention generally described below in FIGS. 2 through 7.

For great detail on intra VOP processing as shown in FIG. 1, the reader is directed to the document entitled "Revised Description of S4h: Geometric Representation Method—II" submitted to International Organization for Standardization (ISO) in November 1996, which is hereby incorporated by reference. That document is believed to be related but not prior art to the invention.

Figure 2:
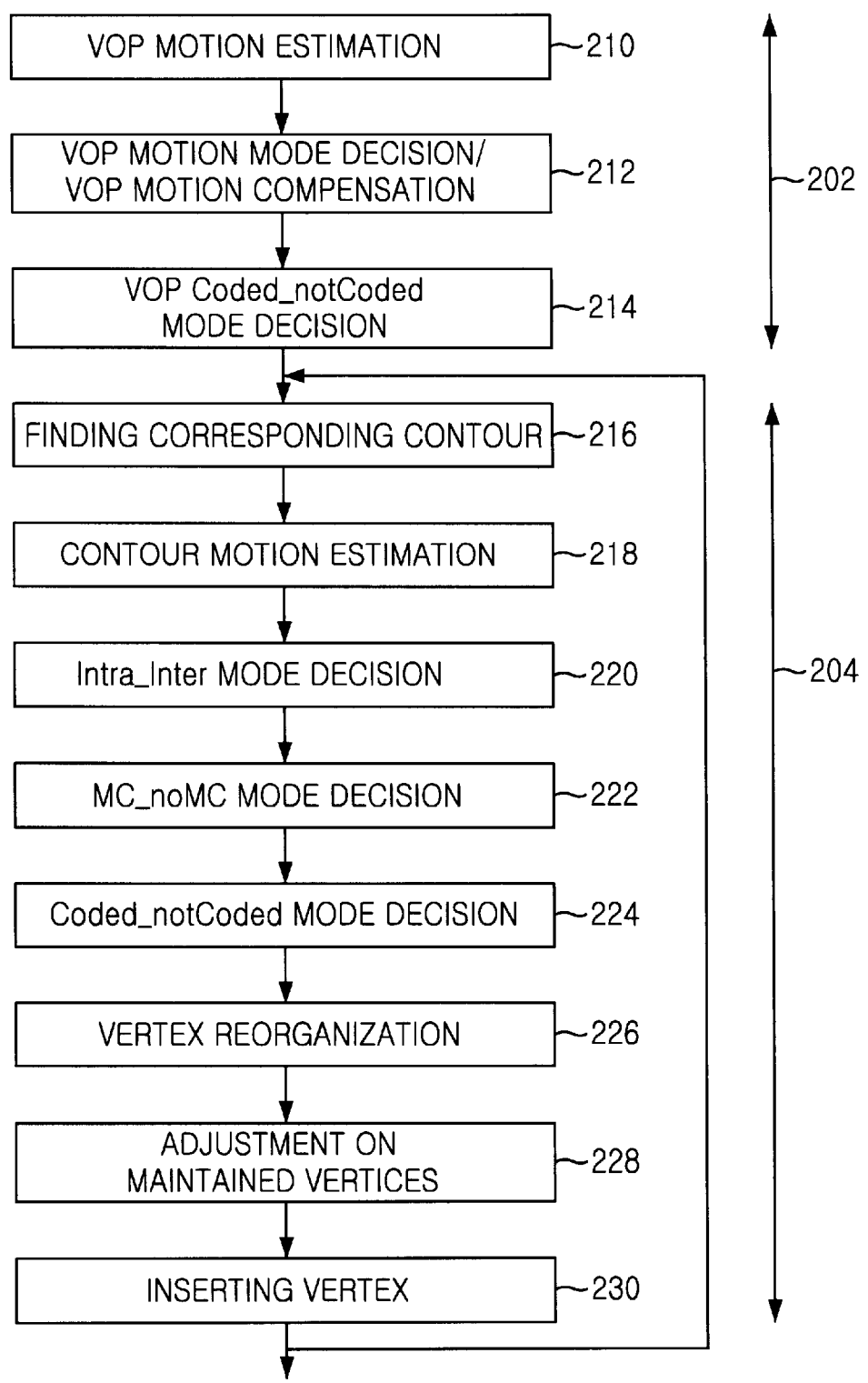
FIG. 2 is a diagram of a method for updating an adjustment-based vertex list of one preferred embodiment of the invention.

Referring now to FIG. 2, a block diagram for a system which incorporates the invention is provided to describe the overall process in connection with a preferred embodiment of the present invention. Note that region labeling and contour extraction may be performed as described above in connection with FIG. 1 before following the process in FIG. 2. If region numbers and contour information are available, this information may be directly inputted to the first process of FIG. 2.

FIG. 2 shows the process involved in determining intra or inter video image encoding mode, VOP motion estimation, motion estimation for a contour and intra or inter mode decision, motion code or no code decision, vertex recognition, vertex adjustment, and vertex insertion. Unlike the process in FIG. 1 for the intra VOP encoding, the process in FIG. 2 can select a better encoding mode (inter or intra) by following the steps, including Intra Inter mode decision 220, MC noMC mode decision 222, and Coded notCoded mode decision 224.

Note that the word "VOP" used in steps 210 through 214 of FIG. 2 is an example to describe a preferred embodiment of the present invention. The word can be substituted with any other terminology which may represent an image-unit in a video image.

When contour information for the current position and previous position are available, VOP motion estimation 210 is performed. Two motion models can be preferably used for VOP-unit motion estimation 210. One is bilinear interpolation using four angle points and the other is simple translation model (or contour-based matching model). In one preferred embodiment for VOP motion estimation, bilinear interpolation can be performed by basically following four steps. First, the smallest enclosing rectangles of the previous VOP shape and the current VOP shape are found. Second, four shifts on each angle from the previous rectangle to the current rectangle are calculated. Third, motion vectors for each pel within the previous rectangles are obtained by bilinear interpolation. Fourth, four shift information are coded by using the motion vectors.

An alternative preferred embodiment for VOP motion estimation can be a contour-based matching method. In this embodiment, contour pels from the previous VOP and the current VOP are compared to find the maximum number of matching. The difference between the previous contour pels and the current contour pels at the maximum matching becomes the motion vector for the VOP. The motion vector can then be transmitted by preferably fixed length coding (FLC).

In step 212, VOP motion mode decision and motion compensation can be performed. If the VOP has moved insignificantly, motion compensation will not be performed. If motion compensation is preferred for a VOP, motion compensation can be performed by either interpolation process or translation process as described above. If motion compensation is not selected, no compensation (no MC) is selected. When motion compensation is selected, then vertices in memory and VOP information for the previous labeled images are motion compensated.

Then, the process can determine whether new VOP information should be coded as in step 214. In this preferred embodiment of the invention, the process calculates the ratio of the number of mismatch pels to the number of pels in current VOP shape. If the ratio is less than preferably 0.005, then the mode is decided notcoded. The threshold value 0.005 is an arbitrary number for this invention. However, any other number can be selected which is suitable for different circumstances. If notCoded is selected, a previously reconstructed shape can be used for current VOP and contour-unit processing 204 will not be performed. If Coded is selected, contour-unit processing 204 can be performed.

In contour-unit processing 204, shape coding type is used for highly efficient compression because shape coding can eliminate the process of transmitting actual coordinates for a video image.

The first step in contour-unit processing 204 is to find the corresponding contour of the video image selected as shown in process 216. When several contours exist in previous video image, the corresponding contour is firstly found using the number of matching pels as a criterion.

Then, contour estimation 218 can be performed. This process is further described below in connection with FIGS. 4 through 6. This process is the heart of the present invention. No prior art has revealed the same technology as invented in the present invention. In the preferred embodiment of the present invention is focused on finding a motion vector for a contour of video image and transmitting only the information related to the motion vector. Therefore, the present invention can eliminate the transmission of redundant data for the video image such as VOP coordinates and contour coordinates, that are not essential to displaying the change to the video image compared to a previous video image.

In step 220, intra or inter mode can be decided according to the value of two matching ratios. In the preferred embodiment of the present invention, the number of pels in the original current contour (no pel c) and previous corresponding contour (no pel p) are used to calculate a first ratio. The ratio is preferably defined as the absolute value of (no pel c−no pel p)/no pel c. Also, the number of pels in the mismatching region (no pel m) are compared to the number of pels in the original current contour (no pel c). The second ratio is defined as (no pel m)/(no pel m).

If the first ratio is preferably less than 0.2 and the second ratio is preferably less than 0.5, then inter mode is decided. However, as with other preferred embodiments of the invention, these ratio thresholds also are arbitrary numbers suitable for the present invention. Therefore, any other values can be used for other applications as may be appropriate.

If the intra mode is decided, vertices are selected for the contour and transmitted to a multiplexer as described in FIG. 1. As also described in FIG. 1, approximated reconstruction and error encoding are performed to send the error information to the multiplexer. If the inter mode is selected, the process further proceed to step 222.

In step 222, a decision can be made whether motion compensation should be performed or not. In the "inter" mode, if the average error of the estimated motion information is great, then the motion compensation needs to be performed and MC is selected. If the motion compensation is not selected (noMC) in step 222, the process skips the steps from 224 to 230.

If the reconstructed contour only using the predictive coordinates (motion compensated or not) from the previous video image is accurate enough, notCoded can be selected in step 224 and the process skips the steps for vertex process, steps 226 through 230. To determine Coded or notCoded, the process compares the actual error of the reconstructed contour with an allowable maximum error ($D_{max}$). If the actual error is preferably less than a certain value (e.g., Dmax+0.5), notCoded can be selected. This value is also an arbitrary number suitable for the present invention. However, other values can be selected in different circumstances. Still referring to FIG. 2, the number of coordinates to be transmitted may also be reduced by using selected vertices. Through steps 226 through 230, reorganization and adjustment are performed for vertices of the contour in order to reduce the amount of data to be transmitted. When vertices are selected for a contour, new vertices are inserted into vertex list to be encoded.

Figure 3:
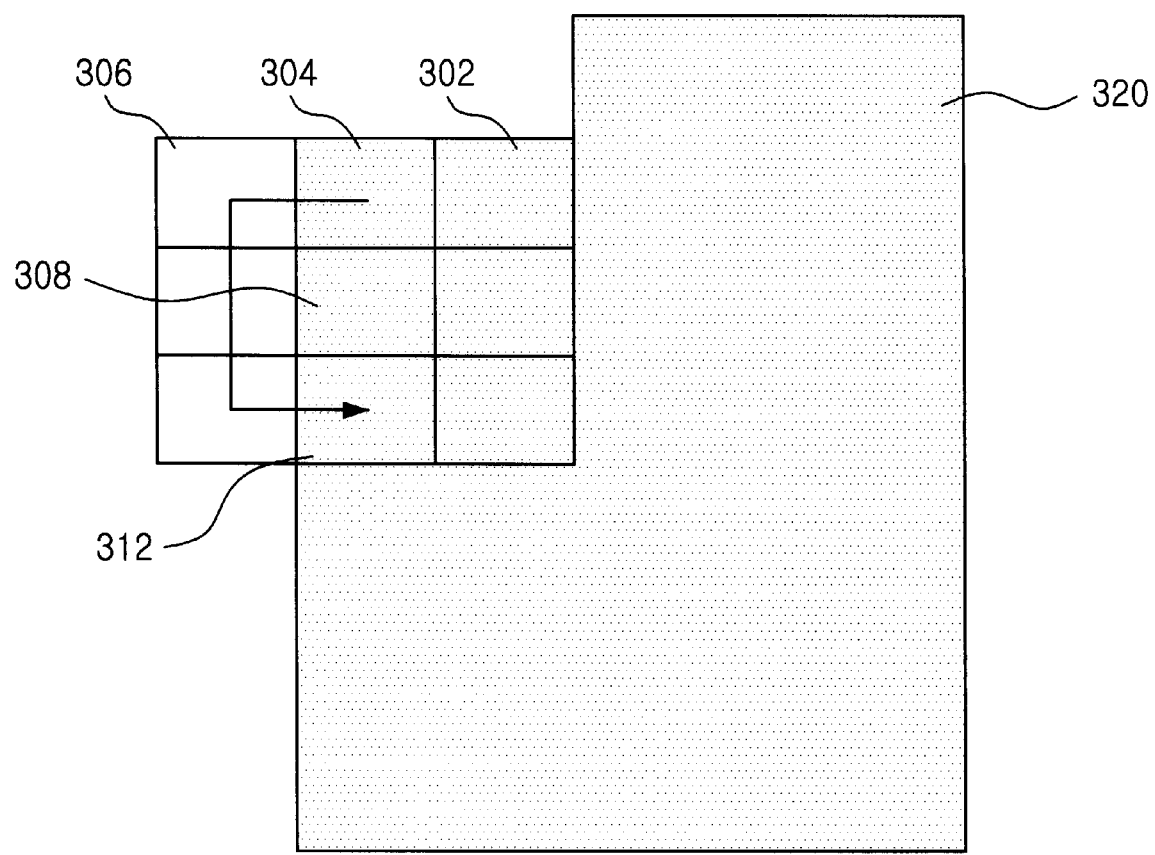
FIG. 3 is a diagram of a method for finding the contour trace used in one preferred embodiment of the invention.

Referring now to FIG. 3, contour extraction and tracing can be preferably performed as herein described. If a contour position list is not available from the transferred information, contour tracing becomes necessary. A region pel can be encountered when each pel is raster scanned in binary mask information. When a region pel is recognized, the process examines the surrounding eight pels (on current video display screens) to find the next region pel. As shown in FIG. 3, Ci 308 is the current contour pel and Ci−1 302 is a previous contour pel. Starting from the next pel 304 of the previous contour pel Ci−1 302, the process of searching for a contour pel in counterclockwise order is carried out. When a new contour pel Ci+1 312 is found, the process stops. Now, the current contour pel Ci 308 becomes a previous contour pel Ci−1 and the new contour pel Ci+1 312 becomes a current contour pel. This process of finding the next contour pel is repeated until a complete contour is found.

If, as described previously above, a video image is appropriate for inter processing and the differences from the previous contour can be compensated by motion estimation, then the invented method and system as depicted in FIGS. 4 through 7 is used. Reference is next made to FIG. 4 through 7, which illustrate in more detail one preferred embodiment of a block diagram derived from block 218 of the block diagram of FIG. 2. Those of ordinary skill in the art will, of course, appreciate that various modifications to the detailed block diagram of FIGS. 4 through 7 may easily be made without departing from the essential characteristics of the invention, as described in connection with the block diagram of FIG. 2 above. Thus, the following description of the detailed block diagram of FIGS. 4 through 7 is intended only as an example, and it simply illustrates one presently preferred embodiment of a block diagram and a system that is consistent with the foregoing description of FIGS. 4 through 7 and the invention as claimed herein.

Figure 4:
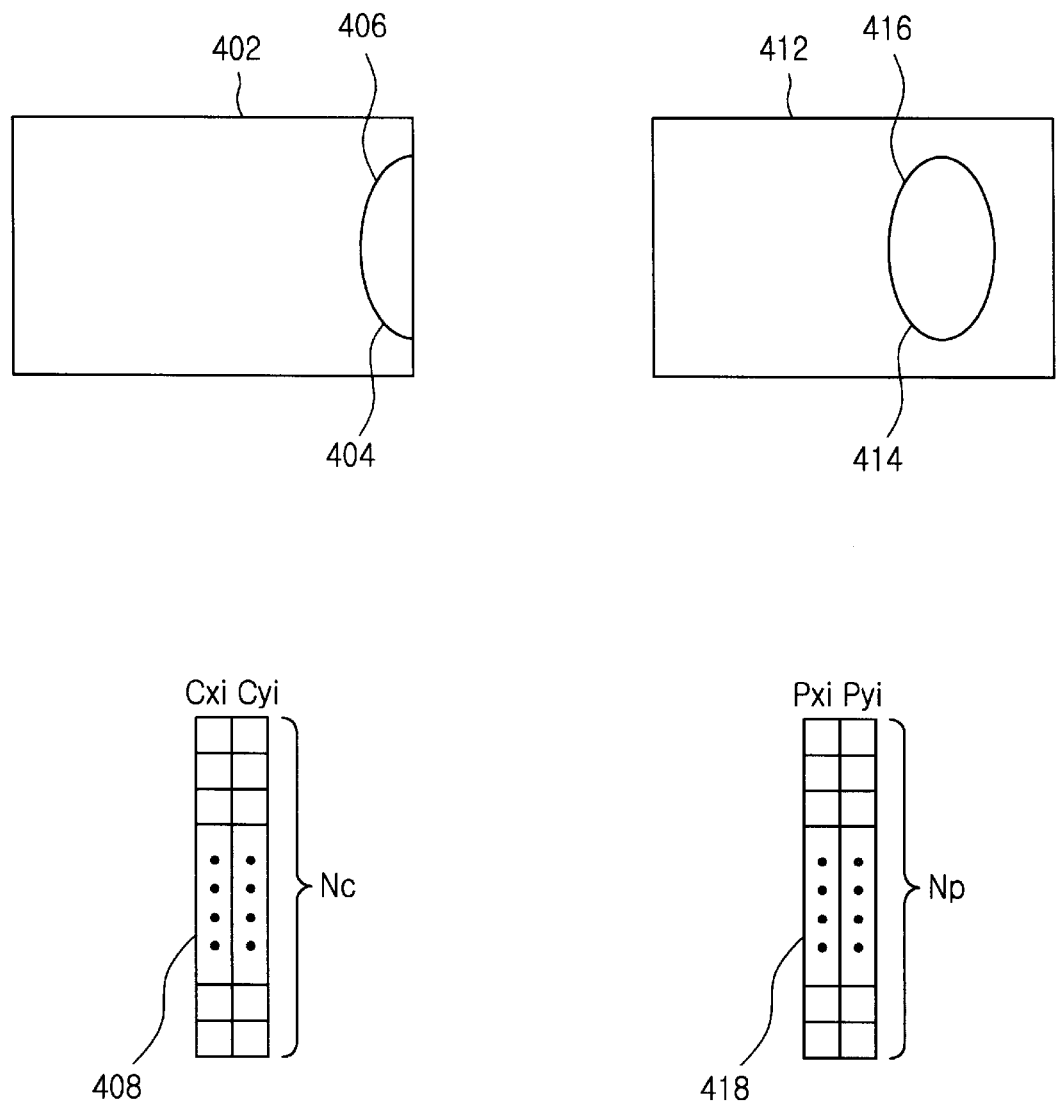
FIG. 4 is a diagram of a method of generating data to represent contour position and previous contour position used in one preferred embodiment of the invention.

Once the contour coordinates are found as shown in FIG. 3, the contour coordinates in each of two successive video images are stored in arrays 408 and 418 respectively as depicted in FIG. 4. The array (Cxi, Cyi) 408 contains coordinates of contour 404 in the previous video image 402. Similarly, the array (Pxi, Pyi) 418 contains the contour 414 coordinates for the current video image 412. Preferably, the coordinates are listed within respective array 408 and 418 beginning from each contour's vertex 406 and 416 respectively. However, the list of coordinates in the arrays may be began from any coordinate on the contour that they array represents.

Figure 5:
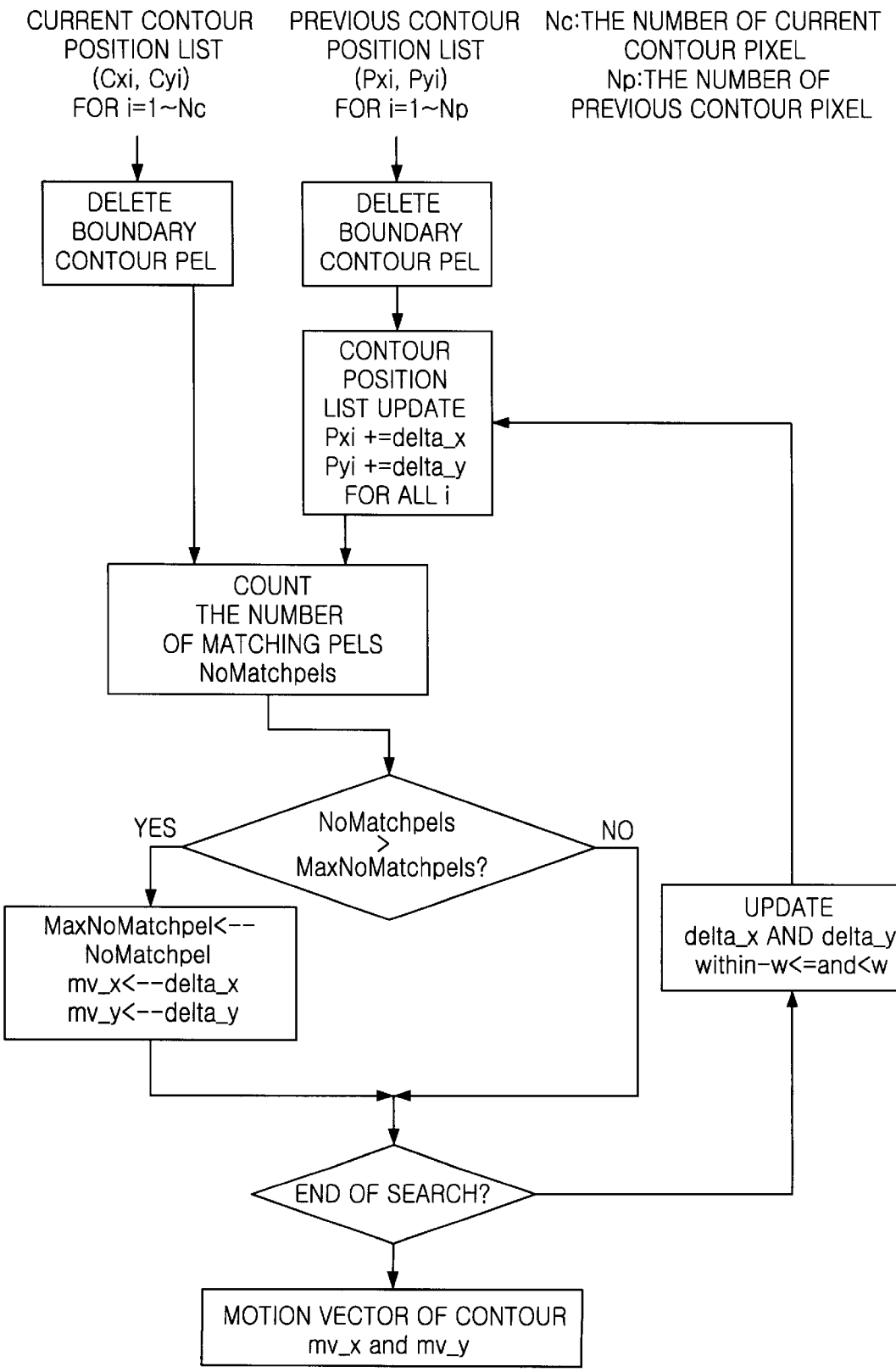
FIG. 5 is a diagram of a method for finding a motion vector of a contour in one preferred embodiment of the invention.

Once contour position lists (e.g., (x,y) coordinates) both for the current and previous video images are available, previous and current position lists are examined to eliminate boundary contour pels, process 502 and 504 of FIG. 5. Boundary elimination can be performed by removing x, y coordinates which contain boundary pels. Removal of boundary coordinates is a very important aspect of the invention. As boundary coordinates are static, using them in a contour comparison is not considered useful. But if they are not eliminated, then when the contours are compared, the boundary coordinates can skew the comparison and cause some important but small contour changes to be overlooked. Therefore, the inventors feel that elimination of boundary coordinates is important to achieving accurate contour comparisons and is performed in the preferred embodiment of the invention.

As an initial value, the number of matching pels (NoMatchPels), maximum number of matching pels (MaxNoMatchPels), delta x and delta y are set to zero. Also, a window value (w) can be preferably set to 32. However, the window value (w) may be any arbitrary number selected for a particular embodiment of the inventive concept. In process 506, the previous contour position coordinates (Pxi, Pyi) are updated by adding delta x and delta y to them. Then the contour coordinates are compared in 508 and then, the number of matching pels is counted by comparing the updated previous contour position coordinates (Pxi, Pyi) with the current contour position coordinate (Cxi, Cyi). In process 510, if the number of matching pels (NoMatchPels) is greater than the maximum number of matching pels (MaxNoMatchPels), then a decision is made that process 512 will be performed. If the number of matching pels (NoMatchPels) is not greater than the maximum number of matching pels (MaxNoMatchPels), the process goes directly to process 514. In process 512, the maximum number of matching pels (MaxNoMatchPels) will be replaced with the number of matching pels (NoMatchPels) which now is a greater number than the previous maximum number of matching pels. Motion vector, mv x and mv y, also assumes the values of delta x and delta y respectively. Note that initially delta a and delta y are zeros, but they are updated through process 516.

The search ends in process 514 when the window value (w) reaches a maximum number for the number of coordinates (i). In this preferred embodiment of the invention, the maximum number for the number of coordinate is either the number of current contour position coordinates (Nc) or the number of previous contour position coordinates (Np). If the search has not been ended in 514, the value delta x and delta y are updated preferably by one integer number in step 516. In addition, number of matching pels (NoMatchPels) may be again set to zero.

Returning to step 506, the updated delta x and delta y may be added to previous contour position coordinates, Pxi and Pyi. When the search ends, the latest delta x and delta y become motion vector (mv x and mv y) of the contour through process 518.

Figure 6A:
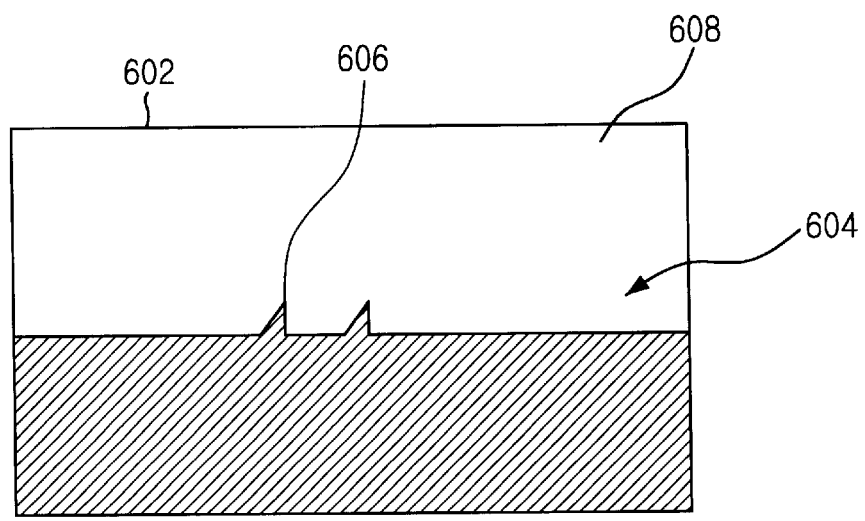
FIG. 6 is a diagram of a method showing an extracted image without boundary lines used in one preferred embodiment of the invention.
Figure 6B:
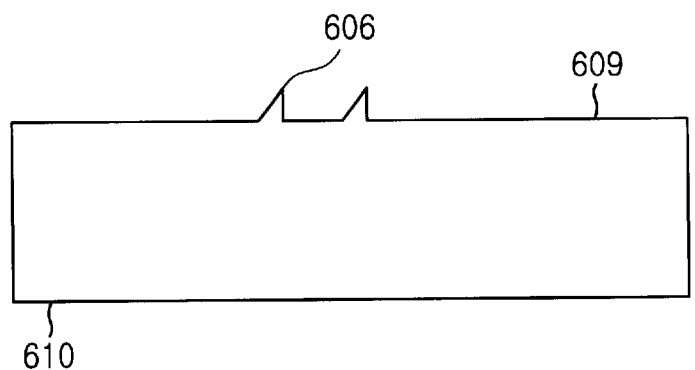
Figure 6C:
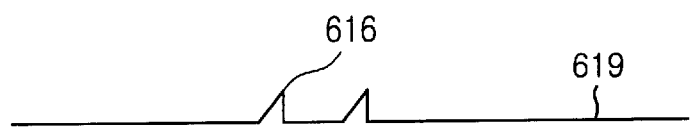

Now referring to FIG. 6, the boundary of video image preferably will be eliminated. FIG. 6(*a*) shows a video image 604 in a frame 602 having a background 608. The video image 604 consists of contour 609 and boundary 610 as depicted in FIG. 6(*b*). The contour 609 has an identifiable shape 606. FIG. 6(*c*) shows one preferred embodiment of the present invention in which the boundary 610 of VOP 604 has been eliminated.

By eliminating the boundary 610, some advantages can be realized. First, processing time can be reduced by eliminating unnecessary coordinates for the boundary 610. Second, a motion vector for video image 604 can be found more accurately than a video image with the boundary 610. When a motion vector is found for video image 604 with boundary 610, the boundary is also considered as a part of the coordinates. Even though identifiable object 606 moved horizontally, current coordinates for boundary 610 are the same as the previous coordinates for the boundary. Therefore, a real motion vector for the identifiable object 606 is difficult to find. If boundary 610 is eliminated as shown in FIG. 6(*c*), coordinates to be considered are only a real contour 619 of video image 604. Therefore, motion estimation for identifiable object 616 of video image 604 can be accurately performed by eliminating the boundary 610.

Figure 7:
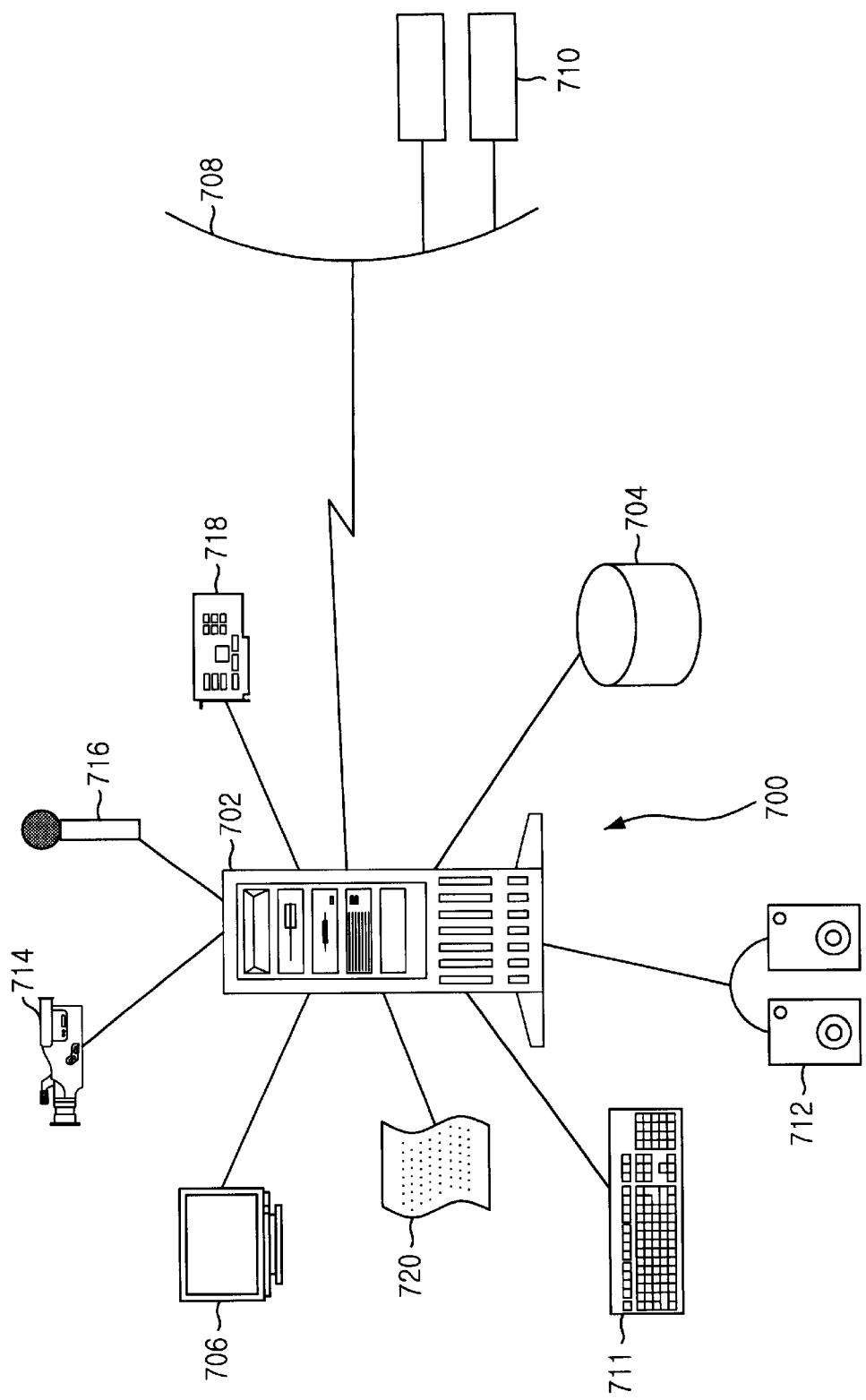
FIG. 7 is a diagram of a system that can be used to implement one preferred embodiment of the present invention.

FIG. 7 depicts an invented system for implementing the invented method. Other than the code and/or central processing unit (CPU) instructions 720, the system 700 includes primarily generic hardware devices.

These devices include central processing unit or computer 702 which may include dynamic memory, such as random access memory (not shown), a keyboard 711, a mass storage device or media 704, and a video display device 706, such as a CRT, monitor, screen, television or other appropriate device. The central processing unit 702 becomes a specialized machine for performing the steps of the invented method by acting upon code or instructions 720.

The code or instructions 720 include material that causes the CPU 720, in conjunction with other devices, to carry out the invented method. The CPU 702 may be connected to a video encoding/decoding device 718 such as an MPEG card or other appropriate card, or encoding/decoding processes may be performed in software.

In the preferred embodiment of the invention, the central processing unit 702 has access to a network 708, such as local area network, wide area network, the World Wide Web or the Internet, to which other nodes or stations 710 are connected through a network connection 707 or any other various accessing technologies. The CPU 702 also may be connected to audio output devices 712 for outputting sound from transmitted data, and the CPU 702 may also be connected to a video input device 714 such as a video camera for receiving video images. Alternatively, video images may be obtained from mass storage media 704, from the network 708 or from other sources. An audio input device 716 may be included to collect audio sound, or audio may be retrieved from mass storage media 704, the network 708 or other sources. Other configurations of this hardware, a subset or a superset of this hardware, the use of more or less software, or the use of entirely different devices may be used to carry out the inventive concept.

The following is a listing of attached computer source code that is used to perform the steps of the invention described above and depicted in FIGS. 2 through 7.

```
file name : MOTION.C
#include <stdio.h>
#include <math.h>
#include "obj.h"
#include "shape.h"
/*---------------------------------------------------*/
void InterpolationMC(recon_f1mask, f2_mask,
    IMVx, IMVy, shiftx, shifty)
uchar recon_f1_mask[ ][IS1] ;
uchar f2_mask[ ][IS1] ;
float IMVx[ ][IS1], IMVy[ ][IS1] ;
int *shiftx, *shifty ;
{ int x, y;

int p_ul_x=0; int p_ul_y=0;
int p_ur_X=0; int p_ur_y=0;
int p_ll_x=0; int p_ll_y=0;
int p_lr_x=0; int p_lr_y=0;

int c_ul_x=0; int c_ul_y=0;
int c_ur_x=0; int c_ur_y=0;
int c_ll_x=0; int c_ll_y=0;
int c_lr_x=0; int c_lr_y=0;

int Shiftulx=0; int Shiftuly=0;
int Shifturx=0; int Shiftury=0;
int Shiftllx=0; int Shiftily=0;
int Shiftlrx=0; int Shiftiry=0;

void BilinearInterpolation4Points( );

printf("\n . . . Interpolation MC is started");
```

```
{
    int min_x = Xsize-1, min_y = Ysize-1 ;
    intmax_x = 0,   max_y = 0;
    for(y = 0; y < Ysize; y++)
    for(x = 0; x < Xsize; x++)
    if(recon_f1_mask[y][x]) {
        if(x < min_x) min_x = x ;
        if(y < min_y) min_y = y ;
        if(x > max_x) max_x = x ;
        if(y > max_y) max_y = y ;
    }
    p_ul_x = min_x ;
    p_ul_y = min_y ;
    p_ur_x = max_x ;
    p_ur_y = min_y ;
    p_ll_x = min_x ;
    p_ll_y = max_y ;
    p_lr_x = max_x ;
    p_lr_y = max_y ;
}
{
    int min_x = Xsize-1, min_y = Ysize-1 ;
    int max_x = 0,   max_y = 0 ;
    for(y = 0; y < Ysize; y++)
    for(x = 0; x < Xsize; x++)
    if(f2_mask[y][x]) {
        if(x < min_x) min_x = x ;
        if(y < min_y) min_y = y ;
        if(x > max_x) max_x = x ;
        if(y > max_y) max_y = y ;
    }
    c_ul_x = min_x ;
    c_ul_y = min_y ;
```

-continued

```
        c_ur_x = max_x ;
        c_ur_y = min_y ;
        c_ll_x = min_x ;
        c_ll_y = max_y ;
        c_lr_x = max_x ;
        c_lr_y = max_y ;
}
Shiftulx = c_ul_x - p_ul_x ;
Shiftuly = c_ul_y - p_ul_y ;
Shifturx = c_ur_x - p_ur_x ;
Shiftury = c_ur_y - p_ur_y ;
Shiftllx = c_ll_x - p_ll_x ;
Shiftlly = c_ll_y - p_ll_y ;
Shiftlrx = c_lr_x - p_lr_x ;
Shiftlry = c_lr_y - p_lr_y ;
/*----- for coding -----*/
    shiftx[1] = Shiftulx ;
    shiftx[2] = Shifturx ;
    shiftx[3] = Shiftllx ;
    shiftx[4] = Shiftlrx ;
    shifty[1] = Shiftuly ;
    shifty[2] = Shiftury ;
    shifty[3] = Shiftlly ;
    shifty[4] = Shiftlry ;
    BilinearInterpolation4Points(p_ul_x, p_ur_x, p_ul_y, p_ll_y, Shiftulx,
Shifturx, Shiftllx, Shiftlrx, Shiftuly, Shiftury, Shiftlly, Shiftlry, IMVx, IMVy) ;
}
/*--------------------------------------------------
    Bilinear Interpolation
        i1  ----  i2
        |         |
        |         |
        |         |
        i3  ----  i4
--------------------------------------------------*/
void BilinearInterpolation4Points(p_ul_x, p_ur_x, p_ul_y, p_ll_y, i1x, i2x, i3x,
i4x, i1y, i2y, i3y, i4y, IMVx, IMVy)
int p_ul_x, p_ur_x ;
int p_ul_y, p_ll_y ;
int i1x, i2x, i3x, i4x ;
int i1y, i2y, i3y, i4y ;
float IMVx[ ][IS1] ;
float IMVy[ ][IS1] ;
{
    int x, y ;
    float fx = 0.0, fy = 0.0 ;
    for(y = 0; y < Ysize; y++)
    for(x = 0; x < Xsize; x++)
    if(x >= p_ul_x && x <= p_ur_x && y >= p_ul_y && y <= p_ll_y)
    {
      fx = (float)(x - p_ul_x) / (float)(p_ur_x - p_ul_x) ;
      fy = (float)(y - p_ul_y) / (float)(p_ll_y - p_ul_y) ;
      IMVx[y][x] = (float)i1x
          + fx * (float)(i2x - i1x)
          + fy * (float)(i3x - i1x)
          + fx * fy * (float)(i1x - i2x + i4x - i3x) ;
      IMVy[y][x] = (float)i1y
          + fx * (float)(i2y - i1y)
          + fy * (float)(i3y - i1y)
          + fx * fy * (float)(i1y - i2y + i4y - i3y) ;
    }
    else
    {
      IMVx[y][x] = 0.0 ;
      IMVy[y][x] = 0.0 ;
    }
}
/*--------------------------------------------------
    ModeDecision_MOTION
    index == 0 : VOP    layer
    index == 1 : contour layer
--------------------------------------------------*/
void ModeDecision_MOTION(index, f2_mask, TMVx, TMVy, IMVx, IMVy,
dmax, MotionMode)
int index ;
uchar f2_mask[ ][IS1] ;
int TMVx, TMVy ;
float IMVx[ ][IS1], IMVy[ ][IS1] ;
float dmax ;
int *MotionMode ;
```

-continued

```
{
    int x, y ;
    int m_count_nomc = 0 ;
    int m_count_t = 0 ;
    int m_count_i = 0 ;
    float nullx[IS2][IS1] ;
    float nully[IS2][IS1] ;
    void VOP_MC_Error() ;
/*----- NoMC error -----*/
    for(y = 0; y < Ysize; y++)
    for(x = 0; x < Xsize; x++)
    {
        nullx[y][x] = 0.0 ;
        nully[y][x] = 0.0 ;
    }
    VOP_MC_Error(index f2_mask, nullx, nully, &m_count_nomc, dmax) ;
/*----- Translational MC error -----*/
    for(y = 0; y < Ysize; y++)
    for(x = 0; x < Xsize; x++)
    {
        nullx[y][x] = (float)TMVx ;
        nully[y][x] = (float)TMVy ;
    }
    VOP_MC_Error(index f2_mask, nullx, nully, &m_count_t, dmax) ;
/*----- Interpolation MC error -----*/
    VOP_MC_Error(index, f2_mask, IMVx, IMVy, &m_count_i, dmax) ;
    printf("\n VOP   M_COUNT  nomc[%5d],  trans  [%5d]  interp[%5d]',
m_count_nomc,
m_count_t, m_count_i) ;
/*f== NOTE f==*/
    if(m_count_nomc >= (m_count_i - 2) && m_count_nomc >= (m_count_t -
2))
        *MotionMode = 0 ;
    else if(m_count_t > m_count_nomc && m_count_t >= m_count_i)
        *MotionMode = 1 ;
    else if(m_count_i > m_count_nomc && m_count_i > m_count_t)
        *MotionMode = 2 ;
}
/*----------------------------------------------------
    VOP_MC : Motion compensation of VOP
    [target]
        p_label_mask and P_MEMORY_VERT
--------------------------------------------------*/
void VOP_MC(MotionMode, IMVx, IMVy, p_label_mask)
int MotionMode ;
float IMVx[] [IS1] ;
float IMVy[] [IS1] ;
uchar p_label_mask[][IS1] ;
{
    int x, y, i, j ;
    float pred_x, pred_y ;
    float imvx = 0, imvy = 0 ;
    uchar tmp_p_label_mask[IS2][IS1] ;
    for(y = 0; y < Ysize; y++)
    for(x = 0; x < Xsize; x++) tmp_p_label_mask[y][x] = 0 ;
/*----- initialize -----*/
    for(j = 1; j <= P_MEMORY_NO_CONTOUR; j++)
    for(i = 0; i < P_MEMORY_NO_VERT[j]; i++)
    {
        P_MEMORY_VERT_X_back[j][i] = P_MEMORY_VERT_X[j][i] ;
        P_MEMORY_VERT_Y_back[j][i] = P_MEMORY_VERT_Y[j][i] ;
    }
/*----- p_label_mask -----*/
    for(y = 0; y < Ysize; y++)
    for(x = 0; x < Xsize; x++)
    {
        pred_x = max(0., min((float)(Xsize-1), (float)x+IMVx[y][x])) ;
        pred_y = max(0., min((float)(Ysize-1), (float)y+IMVy[y][x])) ;
        tmp_p_label_mask[nint(pred_y)][nint(pred_x)] = p_label_mask[y][x] ;
    }
    COPY_IMAGE(p_label_mask, tmp_p_label_mask) ;
/*----- P_MEMORY_VERT_X/Y -----*/
    for(j = 1; j <= P_MEMORY_NO_CONTOUR; j++)
    {
        for(i = 0; i < P_MEMORY_NO_VERT[j]; i++)
        {
            imvx = IMVx[P_MEMORY_VERT_Y[j][i]][P_MEMORY_VERT_X[j][i]] ;
            imvy = IMVy[P_MEMORY_VERT_Y[j][i]][P_MEMORY_VERT_X[j][i]] ;
            pred_x = max(0.0, min((float)Xsize-1, (float)P_MEMORY_VERT_X[j][i]
```

-continued

```
+
imvx));
        pred_y = max(0.0, min((float)Ysize-1, (float)P_MEMORY_VERT_Y[j][i]
+
imvy));
        P_MEMORY_VERT_X[j][i] = nint(pred_x) ;
        P_MEMORY_VERT_Y[j][i] = nint(pred_y) ;
      }
    }
}
/*----------------------------------------------------
      VOP_MC_Error
      [target]
          p_label_mask and P_MEMORY_VERT
------------------------------------------------*/
void VOP_MC_Error(index, mask, IMVx, IMVy, pel_count, dmax)
int index ;
uchar mask[][IS1] ;
float IMVx[][IS1] ;
float IMVy[][IS1] ;
int *pel_count ;
float dmax ;
{
int x, y, xx, yy, i, j ;
int pred_x, pred_y ;
uchar contour[IS2][IS1] ;
float dist, min_dist ;
int imvx, imvy ;
int no_vert = 0 ;
int startx, endx, starty, endy ;
for(y = 0; y < Ysize; y++)
for(x = 0; x < Xsize; x++) contour[y][x] = 0 ;
for(y = 0; y < Ysize; y++)
for(x = 0; x < Xsize; x++)
if(mask[y][x])
{
    if(y == 0)                  contour[y][x] = 1 ;
    else if(!mask[y-1][x])      contour[y][x] = 1 ;
    else if(y == Ysize-1)       contour[y][x] = 1 ;
    else if(!mask[y+1][x])      contour[y][x] = 1 ;
    else if(x == 0)             contour[y][x] = 1 ;
    else if(!mask[y][x-1])      contour[y][x] = 1 ;
    else if(x == Xsize-1)       contour[y][x] = 1 ;
    else if(!mask[y][x+1])      contour[y][x] = 1 ;
}
/*----- VOP level -----*/
    if(index == 0)
    {
       for(j = 1; j <= P_MEMORY_NO_CONTOUR; j++)
       {
          for(i = 0; i < P_MEMORY_NO_VERT[j]; i++)
          {
             min_dist = MIN_DIST ;
             imvx = nint(IMVx[P_MEMORY_VERT_Y[j][i]][P_MEMORY_VERT_X[j][i]]) ;
             imvy = nint(IMVy[P_MEMORY_VERT_Y[j][i]][P_MEMORY_VERT_X[j][i]]) ;
             pred_x = max(0, min(Xsize-1, P_MEMORY_VERT_X[j][i] + imvx)) ;
             pred_y = max(0, min(Ysize-1, P_MEMORY_VERT_Y[j][i] + imvy)) ;
             startx = max(0, min(Xsize-1, pred_x-10)) ;
             endx = max(0, min(Xsize-1, pred_x+10)) ;
             starty = max(0, min(Ysize-1, pred_y-10)) ;
             endy = max(0, min(Ysize-1, pred_y+10)) ;
             for(yy = starty; yy <= endy; yy++)
             for(xx = startx; xx <= endx; xx++)
             if(contour[yy][xx])
             {
                dist = (float)((pred_x-xx)*(pred_x-xx) + (pred_y-yy)*(pred_y-yy)) ;
                dist = (float)sqrt((double)dist) ;
                if(dist < min_dist) min_dist = dist ;
             }
             no_vert++;
             if(min_dist <= dmax) (*pel_count)++ ;
          }
       }
    }
```

```
/*----- contour level : index == corresponding -----*/
    else
    {
      for(i = 0; i < P_MEMORY_NO_VERT[index]; i++)
      {
        min_dist = MIN_DIST ;
        imvx =
nint (IMVx[P_MEMORY_VERT_Y[index][i]][P_MEMORY_VERT_X[index][i]])
;
        imvy =
nint (IMVy[P_MEMORY_VERT_Y[index][i]][P_MEMORY_VERT_X[index][i]])
;
        pred_x = max(0, min(Xsize-1, P_MEMORY_VERT_X[index][i] + imvx))
;
        pred_y = max(0, min(Ysize-1, P_MEMORY_VERT_Y[index][i] + imvy))
;
        startx = max(0, min(Xsize-1, pred_x-10)) ;
        endx = max(0, min(Xsize-1, pred_x+10)) ;
        starty = max(0, min(Ysize-1, pred_y-10)) ;
        endy = max(0, min(Ysize-1, pred_y+10)) ;
        for(yy = starty; yy <= endy; yy++)
        for(xx = startx; xx <= endx; xx++)
        if(contour[yy][xx])
        {
          dist = (float)((pred_x-xx)*(pred_x-xx) + (pred_y-yy)*(pred_y-yy))
;
          dist = (float)sqrt((double)dist) ;
          if(dist < min_dist) min_dist = dist ;
        }
        no_vert++;
        if(min_dist <= dmax) (*pel_count)++ ;
      }
    }
    printf("\n [] no_vert[%d], # of m. vertices[%5d]", no_vert, *pel_count) ;
  }
/*--------------------------------------------------
    Interpolation Coding
--------------------------------------------------*/
void InterpolationCoding(vert_x, vert_y, bit_rate)
int *vert_x ;
int *vert_y ;
int *bit_rate ;
{
    int i, j ;
    int no_vert = 4 ;
    int re_vert_x[5], re_vert_y[5] ;
    int x_max_magnitude = 0, y_max_magnitude = 0 ;
    int x_dynamic_range_indicator, y_dynamic_range_indicator ;
    int no_insert_vertex = 4 ;
    int octant[NOV] ;
    int diff_octant[NOV] ;
    void dynamic_range_indication() ;
    for(i = 0; i <= 4; i++) {
    re_vert_x[i] = 0 ;
    re_vert_y[i] = 0 ;
    }
    for(i=1; i <= 4; i++) {
      re_vert_x[i] = vert_x[i] ;
      re_vert_y[i] = vert_y[i] ;
    }
    for(i = 1; i <= 4; i++)
      if(re_vert_x[i] == 0 && re_vert_y[i] == 0)
        put_bit(1, 1) ;
      else put_bit(0, 1) ;
    (*bit_rate) += 4 ;
    for(i = 1; i <= no_vert; i++)
      if(re_vert_x[i] == 0 && re_vert_y[i] == 0) {
        for(j = i+1; j <= no_vert; j++) {
          re_vert_x[j-1] = re_vert_x[j] ;
          re_vert_y[j-1] = re_vert_y[j] ;
        }
        no_vert-- ;
        i-- ;
      }
/*-----x, y dynamic range indicator -----*/
    for(i = 1; i <= no_vert ;i++)
    {
      if(abs(re_vert_x[i]) > x_max_magnitude)
        x_max_magnitude = abs(re_vert_x[i]) ;
```

-continued

```
            if(abs(re_vert_y[i]) > y_max_magnitude)
                y_max_magnitude = abs(re_vert_y[i]) ;
        }
        dynamic_range_indication(x_max_magnitude,
&x_dynamic_range_indicator) ;
        dynamic_range_indication(y_max_magnitude,
&y_dynamic_range_indicator) ;
        put_bit(x_dynamic_range_indicator, 3) ;
        put_bit(y_dynamic_range_indicator, 3) ;
        (*bit_rate) += 6 ;
/*----- make differential octant -----*/
        for(i = 1; i <= no_vert; i++)
        {
          int octant_value ;
          void octant_decision () ;
          octant_decision(re_vert_x[i], re_vert_y[i], &octant_value) ;
          octant[i] = octant_value ;
        }
        octant[0] = 0 ;
        for(i = 1; i <= no_vert; i++)
        {
          diff_octant[i] = octant[i] - octant[i-1] ;
          if(diff_octant[i] < -3) diff_octant[i] += 8 ;
          else if(diff_octant[i] > 3) diff_octant[i] -= 8 ;
          if(abs(diff_octant[i]) > 3) diff_octant[i] = 4 ;
        }
        for(i = 1; i <= no_vert; i++)
        {
          int major_component, minor_component ;
/*----- major component of relative address -----*/
          if(octant[i] == 0 || octant[i] == 3 ||
             octant[i] == 4 || octant[i] == 7)
            major_component = abs(re_vert_x[i]) - 1 ;
          else major_component = abs(re_vert_y[i]) - 1 ;
/*---- minor component of relative address -----*/
          if(octant[i] == 0 || octant[i] == 4)
            minor_component = abs(re_vert_y[i]) ;
          else if(octant[i] == 3 || octant[i] == 7)
            minor_component = abs(re_vert_y[i]) - 1 ;
          else if(octant[i] == 2 || octant[i] == 6)
            minor_component = abs(re_vert_x[i]) ;
          else if(octant[i] == 1 || octant[i] == 5)
            minor_component = abs(re_vert_x[i]) - 1 ;
          {
          int minor_component_bit ;
/*----- differential octant code -----*/
          put_bit(differential octant_code[diff_octant[i]+3],
              differential_octant_bit[diff_octant[i]+3]) ;
          (*bit_rate) += differential_octant_bit[diff_octant[i]+3] ;
/*----- major component of relative address -----*/
          if(octant[i] == 0 || octant[i] == 3 ||
             octant[i] == 4 || octant[i] == 7)
          {
            put_bit(major_component, x_dynamic_range_indicator) ;
            (*bit_rate) += x_dynamic_range_indicator ;
          }
          else {
            put_bit(major_component, y_dynamic_range_indicator) ;
            (*bit_rate) += y_dynamic_range_indicator ;
          }
/*----- # of bits minor component of relative address-----*/
          if(octant[i] == 0 || octant[i] == 3 ||
             octant[i] == 4 || octant[i] == 7)
            minor_component_bit = min((y_dynamic_range_indicator+1),
                (int)ceil(log((double)(major_component+1))/log(2.0))) ;
          else
            minor_component_bit = min((x_dynamic_range_indicator+1),
                (int)ceil(log((double)(major_component+1))/log(2.0))) ;
          put_bit(minor_component, minor_component_bit) ;
          (*bit_rate) += minor_component_bit ;
          }
        }
  }
}
/*--------------------------------------------------
    MODE DECISION CODED-NOTCODED IN VOP LEVEL
--------------------------------------------------*/
void ModeDecision_CODED(f1_mask, f2_mask, VOP_Coded)
uchar f1_mask[][IS1] ;
uchar f2_mask[][IS1] ;
```

```
                                    -continued int *VOP_Coded ;
{
    int x, y ;
    int mismatch_pel = 0 ;
    int f2_pel = 0 ;
    float ratio ;
    for(y = 0; y < Ysize; y++)
    for(x = 0; x < Xsize; x++)
    {
        if(f1_mask[y][x] != f2_mask[y][x]) {
            mismatch_pel++ ;
        }
        if(f2_mask[y][x]) f2_pel++ ;
    }
    ratio = (float)mismatch_pel / (float)f2_pel ;
/*f== NOTE f==*/
    if(ratio < 0.005) *VOP_Coded = 1 ;
    else              *VOP_Coded = 0 ;
    printf("\n\t f1 vs. f2 Dn [%5.2f] : VOP_MODE_CODED [%2d]", ratio,
*VOP_Coded) ;
}
/*------------------------------------------------------
--------------------------------------------------*/
void TranslationMC(f1_mask, f2_mask, TMVx, TMVy)
uchar f1_mask[][IS1] ;
uchar f2_mask[][IS1] ;
int *TMVx, *TMVy ;
{
    int i, j ;
    int x, xx, y, yy ;
    int mv_x = 0, mv_y = 0 ;
    int no_pel_cur = 0, no_pel_pre = 0 ;
    int addr_x[NOP], addr_y[NOP] ;
    uchar pre_contour[IS2][IS1], cur_contour[IS2][IS1] ;
    int max_no_match_pel = 0 ;
    printf("\n . . . Translational MC is started") ;
    for(y = 0; y < Ysize; y++)
    for(x = 0; x < Xsize; x++)
    {
        cur_contour[y][x] = 0 ;
        pre_contour[y][x] = 0 ;
    }
/*----- make contour image -----*/
    for(y = 1; y < Ysize-1; y++)
    for(x = 1; x < Xsize-1; x++)
    if(f1_mask[y][x])
    {
        if(!f1_mask[y-1][x]) pre_contour[y][x] = 1 ;
        if(!f1_mask[y+1][x]) pre_contour[y][x] = 1 ;
        if(!f1_mask[y][x+1]) pre_contour[y][x] = 1 ;
        if(!f1_mask[y][x+1]) pre_contour[y][x] = 1 ;
    }
    for(y = 1; y < Ysize-1; y++)
    for(x = 1; x < Xsize-1; x++)
    if(f2_mask[y][x])
    {
        if(!f2_mask[y-1][x]) cur_contour[y][x] = 1 ;
        if(!f2_mask[y+1][x]) cur_contour[y][x] = 1 ;
        if(!f2_mask[y][x+1]) cur_contour[y][x] = 1 ;
        if(!f2_mask[y][x+1]) cur_contour[y][x] = 1 ;
    }
    printf("\n\t . . . contour matching") ;
    for(j = -7; j <= 8; j++)
    for(i = -7; i <= 8; i++)
    {
        int no_match_pel = 0 ;
        for(y = 0; y < Ysize; y++)
        for(x = 0; x < Xsize; x++)
        if(pre_contour[y][x])
        {
            yy = max(0, min(Ysize-1, y+j)) ;
            xx = max(0, min(Xsize-1, x+i)) ;
            if(cur_contour[yy][xx]) no_match_pel++ ;
        }
        if(no_match_pel > max_no_match_pel)
        {
            max_no_match_pel = no_match_pel ;
            mv_x = i;
            mv_y = j;
```

-continued

```
        }
    }
    printf("\n\t [] mv_x[%3d], mv_y[%3d] in VOP ME", mv_x, mv_y) ;
    *TMVx = mv_x ;
    *TMVy = mv_y ;
}
```

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed is:

1. A method for producing a video image for display in a sequence of video images, the method comprising the steps of:

obtaining a first contour of a first video image in a sequence of video images;

obtaining a second contour of a second video image in said sequence of video images, said second video image being later in said sequence of video images than said first video image;

determining a first set of contour coordinates from said first contour and a second set of contour coordinates from said first contour and a second set of contour coordinates from said second contour;

generating a motion vector from said first and second sets of contour;

using said motion vector to display said second video image; and deleting exterior boundaries from said first and second sets of contour coordinates.

2. A method as recited in claim 1 wherein said motion vector is generated by making a pel by pel comparison between said first and said second sets of contour coordinates.

3. A method as recited in claim 1 wherein said motion vector is generated by successively adjusting a coordinate differential delta in order to estimate position of said second contour with respect to said first contour.

4. A method as recited in claim 1 wherein said motion vector is generated by successively:

comparing said second set of contour coordinates representing the position of said second contour with said first set of contour coordinates representing the position of said first contour;

determining the number of pels which match between said first and second sets of contour coordinates sets; and determining if the current number of matching pels is greater than any previous number of matching pels to make a best estimate of said second contour's position.

5. A method as recited in claim 1 further comprising:

obtaining a range of estimated movement (−w . . . w) of said second contour with respect to said first contour;

using said range of estimated movement (−w . . . w) to successively estimate a motion vector of said second contour with respect to said first contour; and selecting as an actual motion vector for said second contour with respect to said first contour that motion vector which produces the greatest number of matching pels when a comparison is made between said first and second sets of coordinates.

6. A method as recited in claim 1 wherein said coordinates sets are (x,y) coordinates representing physical locations of pels on a contour within a video image.

7. A method as recited in claim 1 wherein said step of determining a set of contour coordinates comprises:

locating a pel on the contour;

recording coordinates representing said pel;

from said pel, ascertaining which, if any, adjacent pel is also on said contour; and recording coordinates representing said adjacent pel.

8. A method as recited in claim 7 wherein said steps of using a pel on a contour to locate an adjacent pel on the contour and recording coordinates representing said adjacent pel are repeated until a set of coordinates representing the contour is created.

9. A method as recited in claim 8 wherein pels adjacent to a pel on a contour are checked to determine if they are also on the contour, said checking occurring in a sequence which is selected from the group of sequences consisting of counterclockwise and clockwise sequences.

10. A method as recited in claim 8 wherein said contour coordinate sets are stored as (x,y) coordinates representing the physical location of pels on the contour.

11. A method for determining a difference between successive contours in a sequence of video images, the method comprising the steps of:

obtaining a first video image in a sequence of video images;

obtaining a second video image in said sequence of video images;

said second video image being later in said sequence of video image than said first video image;

determining a first contour from said first video image, said first contour containing pels;

determining a second contour from said second video image, said second contour containing pels;

eliminating boundaries from said first and said second contours;

making a pel by pel comparison between said first and second contours to produce data representing a difference between said first and second contours.

12. A method as in claim 11 wherein said comparison step comprises:

assuming various arbitrary difference factors deltai between pels on said first contour and pels on said second contour;

comparing said various difference factors deltai to said second contour pels;

selecting the difference factor deltai which produces the closest estimation of the location of said second contour with respect to the location of said first contour.

13. A method for transferring a video image, comprising the steps of:
    obtaining a first video image:
    if the first video image exists within a sequence of video images, then obtaining a second video image;
    if the first video image does not exist within a sequence of video images, transferring the first video image,
    wherein the step of transferring the first video image includes the steps of:
        labeling regions within said first video image,
        extracting contours from said labeled regions,
        selecting vertices on said contours,
        encoding said vertices,
        encoding error information,
        multiplexing said encoded subject matter and transferring it to a desired location;
        if a difference between the first video image and the second video image is greater than a predetermined threshold value, then transmitting the second video image; and
        if not, transmitting the second video image by contour-based motion estimation.

14. A method for performing contour-based motion estimation, the method comprising the steps of:
    obtaining a first contour of a first video image in a sequence of video images;
    obtaining a second contour of a second video image in a sequence of video images, said second video image being later in said sequence than said first video image;
    determining a first set of contour coordinates for said first contour, said contour coordinates containing pels;
    determining a second set of contour coordinates for said second contour, said contour coordinates containing pels;
    obtaining a window value for use in comparing said first contour coordinates to said second contour coordinates;
    establishing a maximum number of matching pels that can exist between said first and second sets of contour coordinates;
    setting differential variables delta x and delta y based on said window value;
    comparing said second contour coordinates to said first contour coordinates using said differential variables delta x and delta y and incrementing a counter if a pel compared matches between said first and second contours;
    if the number of matching pels between the first and second sets of contour coordinates for a particular set of differential variables delta x and delta y exceeds the number of matching pels for all other sets of differential variables delta x and delta y, then use the differential variables delta x and delta y as a motion vector which estimates the contour-based motion between said first contour and said second contour and eliminating boundary data from said sets of contour coordinates.

15. A method as recited in claim 14 wherein said contour coordinates sets are stored in arrays.

16. A system of producing a video image for display in a sequence of video images, which has a central processing unit of a computer, mass storage media, dynamic memory, video input apparatus, audio input apparatus, video display apparatus and audio output apparatus, the system comprising:
    apparatus for obtaining a first contour from a first video image and a second contour from a second video image in said sequence of video images, said second video image being later in said sequence of video images than said first video image;
    apparatus for determining a set of contour coordinates for each of said first and said second contours, said apparatus including a central processing unit and computational instructions for use by said central processing unit;
    apparatus for generating a motion vector from said contour coordinates for said first and second contours, said apparatus including a central processing unit and computational instructions for use by said central processing unit;
    video display apparatus for displaying said second video image using said motion vector; and
    means for deleting exterior boundaries from said first and second set of contour coordinates.

17. A system as recited in claim 16 wherein said motion vector may be generated by said central processing unit by making a pel by pel comparison between said first and said second sets of contour coordinates.

18. A system as recited in claim 16 wherein said central processing unit may generate said motion vector by successively adjusting a coordinate differential delta in order to estimate position of said second contour with respect to said first contour.

19. A system as recited in claim 16 wherein said central processing unit is capable of generating said motion vector by successively using:
    a comparison of said second set of coordinates representing the position of said second contour to said first set of coordinates representing the position of said first contour;
    a determination of the number of pels which match between said first and second contours; and
    a determination whether the current number of matching pels is greater than any previous number of matching pels to make a best estimate of said second contour's position and thereby generating a motion vector.

20. A system as recited in claim 16 further comprising:
    instructions usable with said central processing unit for obtaining a range of estimated movement (−w ... w) of said second contour with respect to said first contour;
    instructions usable with said central processing unit for using said range of estimated movement (−w ... w) to successively estimate motion vectors of said second contour with respect to said first contour; and
    instructions usable with said central processing unit for selecting as the actual motion vector for said second contour with respect to said first contour that motion vector which produces the greatest number of matching pels when compared with said coordinates representing the contour of said second contour.

21. A system as recited in claim 16 wherein
    said coordinates are (x,y) coordinates representing physical locations of pels on a contour within a video image.

22. A system as recited in claim 16 wherein said apparatus for determining a set of contour coordinates comprises:
    instructions usable with said central processing unit for locating a pel on the contour;
    instructions usable with said central processing unit for recording coordinates representing said pel;
    instructions usable with said central processing unit for ascertaining which, if any, adjacent pel is also on said contour; and instructions usable with said central processing unit for recording coordinates representing said adjacent pel.

23. A system as recited in claim 22 wherein apparatus for using a pel on the contour to locate an adjacent pel on the contour and apparatus for recording coordinates representing said adjacent pel may be used repeatedly until a set of coordinates representing the contour are created.

24. A system as recited in claim 23 including:
   instructions usable with said central processing unit to move from a pel on said contour to an adjacent pel, checking each pel to determine if it is also on the contour, said checking occurring in a sequence which is selected from the group of sequences consisting of counterclockwise and clockwise sequences.

25. A system as recited in claim 23 wherein said contour coordinates are storable as (x,y) coordinates representing the physical location of a pel on the contour.

26. A system for determining a difference between successive contours in a sequence of video images, the system comprising:
   a device for obtaining a first and a second video image in said sequence of video images, said second video image being later in said sequence of video images than said first video image;
   a computational device and instructions for use with the computational device for determining a first contour representing said first video image, said first contour containing pets;
   a computational device and instructions for use with the computational device for determining a second contour representing said second video image, said second contour containing pels;
   a computational device and instructions for use with the computational device for eliminating boundaries from said first and second contours;
   a computational device and instructions for use with the computational device for making a pel by pel comparison between said first and second contours to produce data representing a difference between said first and second contours.

27. An apparatus for performing contour-based motion estimation comprising:
   a device for obtaining a first contour from a first video image in a sequence of video images;
   a device for obtaining a second contour from a second video image in a sequence of video images, said second video image being later in said sequence than aid first video image;
   a devcie for determining a first set of contour coordinates for said first contour, said contour coordinates containing pels;
   a device for obtaining a window value for use in comparing said first contour coordinates to said second contour coordinates;
   a device for establishing a maximum number of matching pels that can exist between said first and second sets of contour coordinates;
   a device for setting differential variables delta x and delta y based on said window value;
   a device for comparing said second contour coordinates with said first contour coordinates using said differential variables delta x and delta y and incrementing a counter if a pel compared matches between said first and second contours;
   a device for determining if the number of matching pels between said first and second sets of contour coordinates for a particular set of differential variables delta x and delta y exceeds the number of matching pels for all other sets of differential variables delta x and delta y, then using the differential variables delta x and delta y as a motion vector which estimates the contour-based motion between said first contour and said second contour; and
   a device for eliminating boundary data from said contour coordinates.

28. An apparatus as recited in claim 27 wherein said contour coordinates are storable in arrays.

29. Computer software for performing contour-based motion estimation comprising:
   a routine for obtaining a first contour from a first video image in a sequence of video images;
   a routine for obtaining a second contour from a second video image in a sequence of video images, said second video image being laer in said sequence than said first video image;
   a routine for determining a first set of contour coordinates for said second contour; and
   a routine for eliminating boundary data from said contour coordinates.

* * * * *